(No Model.) 2 Sheets—Sheet 1.
L. H. TAYLOR, Jr. & S. D. STROHM.
SPEED INDICATOR AND RECORDER.
No. 266,921. Patented Oct. 31, 1882.
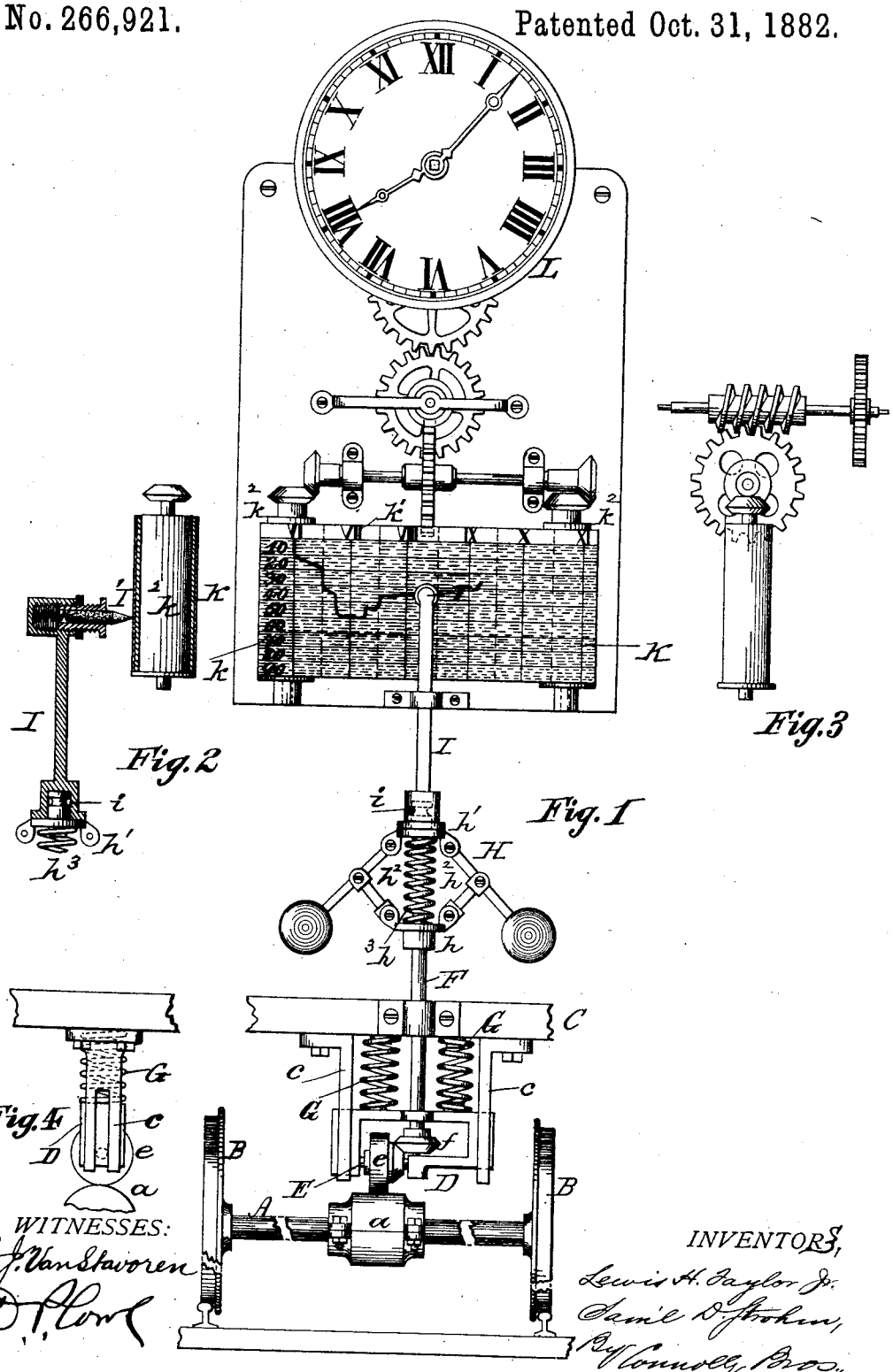
WITNESSES:
S. J. Van Stavoren
D. T. Low
INVENTORS,
Lewis H. Taylor Jr.
Sam'l D. Strohm,
By Connolly Bros.,
ATTORNEYS (No Model.) 2 Sheets—Sheet 2.

L. H. TAYLOR, Jr. & S. D. STROHM.
SPEED INDICATOR AND RECORDER.

No. 266,921. Patented Oct. 31, 1882.

WITNESSES:
S. J. Van Stavoren
E. D. Connolly

INVENTORS,
Lewis H. Taylor Jr.
Sam'l D. Strohm,
By Connolly Bros,
ATTORNEYS

N. PETERS, Photo-Lithographer, Washington, D. C.

UNITED STATES PATENT OFFICE.

LEWIS H. TAYLOR, JR., AND SAMUEL D. STROHM, OF PHILADELPHIA, PA.

SPEED INDICATOR AND RECORDER.

SPECIFICATION forming part of Letters Patent No. 266,921, dated October 31, 1882.

Application filed January 6, 1882. (No model.)

*To all whom it may concern:*

Be it known that we, LEWIS H. TAYLOR, Jr., and SAMUEL D. STROHM, citizens of the United States, residing at Philadelphia, in the county of Philadelphia and State of Pennsylvania, have invented certain new and useful Improvements in Speed Indicators and Registers; and we do hereby declare the following to be a full, clear, and exact description of the invention, reference being had to the accompanying drawings, which form part of this specification, and in which—

Figure 5:
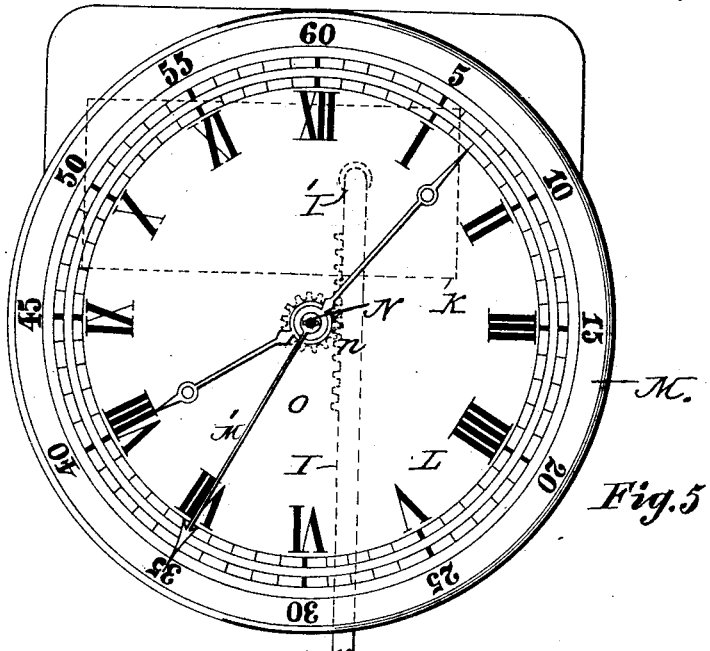
Figure 6:
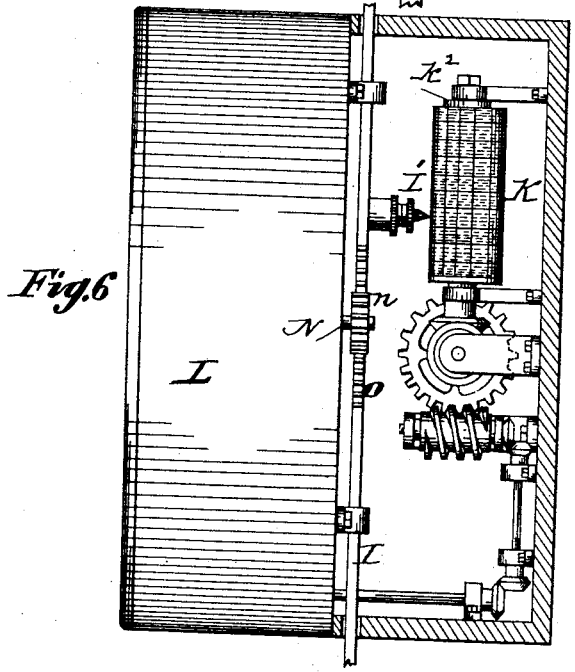

Figure 1 is an elevation of devices embodying our invention. Figs. 2, 3, and 4 are detail views of the same. Fig. 5 is an elevation of another form of devices embodying our invention, and Fig. 6 is a transverse section, partly in elevation, of the same.

Our invention has for its object to provide a speed indicator and register; and our improvements consist in the peculiar construction and combination of parts hereinafter fully set forth.

Our invention comprises a clock or timepiece for noting the hour and an exposed register for indicating speed, together with a concealed or covered removable recorder for indicating the speed and noting the time at which such speed was made.

Referring to the accompanying drawings, A indicates the axle of a locomotive-engine or other vehicle or the shaft of a machine to which our device is applied. Said axle is shown mounted on wheels B B.

C represents a portion of the rigid frame of the engine, to which are secured slotted hangers *c c*.

D is a cross-head adapted and designed to move vertically, as in guides in the hangers *c c*, affording bearings to a short horizontal shaft, E, and to a vertical shaft, F.

*a, e*, and *f* are frictional wheels, whereby motion is communicated from axle A to shaft F, springs G G being provided to press down the cross-head D and maintain good frictional contact between said wheels, as also to relieve jarring and jolting.

H represents a governor having heads $h\ h'$, to which arms $h^2\ h^2$ are pivoted. Between said heads is a spring, $h^3$, the purpose of which is to take up shock and produce an easy motion of the recording and registering devices.

I represents an arm aligned with the shaft F, and secured to the governor-head $h'$ by a swivel-connection, $i$, (shown plainly in Fig. 2,) so that said arm will rise and fall with the head $h'$, yet not rotate with the latter. The arm I carries a pencil, stylus, or marker, I', which bears against a traveling band, K, thereby producing a graphic recording-line on said band. The band K has a vertical scale of miles (shown at $k$) and a notation of hours (indicated at $k'$) on one of its horizontal margins. Said band travels on rollers $k^2\ k^2$, which are connected by the intermediate gearing (shown in Figs. 1 and 3) with the works of a clock, L, so as to run synchronously with such clock—*i. e.*, the band will travel past a fixed point at the same rate that the hour-hand of the clock moves.

The operation is as follows: The clock goes constantly and the band K moves correspondingly. If the engine be standing, the pencil will mark a horizontal line on the upper margin of the band. When the engine starts and attains speed the governor-arms swing correspondingly to the rate of such speed, moving the head $h'$ and arm I as such speed varies. The graphic line thus made by the pencil records on the band K the speed at which the engine runs and the time at which such speed is made. Thus on the completion of a run the band K will indicate the speed made on every part of the road over which the engine has traveled, and also the hour and minute at which such speed was attained, the variations therein, and the time occupied in stops. As the recording strip is intended to be kept concealed or covered, so as to be secure from falsification by the engineer, the latter cannot learn from it the speed he is making. To give him such knowledge, however, the band may be covered with glass, or a supplementary dial may be provided having an index-finger moved from the vertical shaft I. M in Fig. 5 represents said dial shown as arranged to surround the clock-dial, though this arrangement may be modified. This dial we designate the "speed-dial," (to distinguish it from the clock-dial,) and it has a scale of miles laid off on it, as shown. M' represents the index-finger on a shaft, N, carrying a pinion, $n$. Said pinion is in gear with a rack, O, attached to or formed on the arm I, so as to move therewith. As said arm rises and falls with the varying speed of the engine, the index is thereby caused to move over the speed-dial, indicating thereon the rate of motion. Thus it will be seen that the clock indicates the time and the speed-dial shows the rate at which the engine is traveling. The band K is also making a record corresponding thereto, the line drawn by the pencil indicating both the rate of speed and the time at which the same is made. The band K is designed to be removable, so that on the completion of the run or trip of an engine, or at any other time, said band may be taken out to be kept as a permanent record, a fresh band being supplied in its place.

The device shown in the drawings (marked H) and herein described as a "governor" is in general appearance like a steam-governor; but any equivalent device may be substituted therefor—as, for example, a single arm pivoted so as to swing outwardly by centrifugal action, so as to impart longitudinal movement to the arm I and its marker.

The purpose of the spring $h^3$ is to prevent the governor-arms from falling suddenly when quick stops are made, and also to take up jolts and jars in running and prevent a quivering motion of the marker.

What we claim as our invention is as follows:

1. In a speed-indicator, the combination, with the axle or shaft A, of hangers c c, cross-head D, shafts E and F, gear-wheels a, e, and f, and springs G G, substantially as shown and described.

2. The combination, with clock or time-piece L, of the surrounding speed-dial M and index M', having movement independently of the clock-work, whereby both the time and rate of speed are simultaneously denoted on the face of the clock.

3. In a speed indicator and register, the combination of a clock having time and distance marks on its face and hands with independent movements, a traveling band moved thereby, said band having time and distance scales marked upon it, a marker capable of moving transversely to the direction of the movement of the band, an axle or shaft, and intermediate devices between said axle or shaft and marker for communicating to the marker a motion depending in extent upon the rate of rotation of said axle or shaft, whereby a continuous line representing the rate of speed is marked upon the band and the rate of speed and time of day are indicated on the dial, substantially as set forth.

In testimony that we claim the foregoing we have hereunto set our hands this 27th day of December, 1881.

LEWIS H. TAYLOR, Jr.
    SAMUEL D. STROHM.

Witnesses:
 CHAS. MATHEWS, Jr.,
 S. J. VAN STAVOREN.